United States Patent
Gorek (10) Patent No.: US 9,075,157 B2
(45) Date of Patent: Jul. 7, 2015

(54) BENDING CORRECTION FOR DEEP READING AZIMUTHAL PROPAGATION RESISTIVITY

(75) Inventor: Matthias Gorek, Lower Saxony (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 624 days.

(21) Appl. No.: 13/404,535

(22) Filed: Feb. 24, 2012

(65) Prior Publication Data
US 2013/0226459 A1 Aug. 29, 2013

(51) Int. Cl.
*G06F 19/00* (2011.01)
*G01V 3/28* (2006.01)
*E21B 47/024* (2006.01)
*E21B 47/09* (2012.01)

(52) U.S. Cl.
CPC ............... *G01V 3/28* (2013.01); *E21B 47/024* (2013.01); *E21B 47/0905* (2013.01)

(58) Field of Classification Search
CPC ....................................................... G01V 3/28
USPC ............................................................ 702/7
See application file for complete search history.

(56) References Cited

U.S. PATENT DOCUMENTS

| | | | |
|---|---|---|---|
| 5,557,201 A | 9/1996 | Kleinberg et al. | |
| 6,147,496 A * | 11/2000 | Strack et al. | 324/343 |
| 6,226,595 B1 * | 5/2001 | Rossi et al. | 702/10 |
| 6,304,086 B1 * | 10/2001 | Minerbo et al. | 324/338 |
| 6,556,015 B1 | 4/2003 | Omeragic et al. | |
| 6,924,646 B2 * | 8/2005 | Omeragic | 324/338 |
| 6,952,101 B2 * | 10/2005 | Gupta | 324/339 |
| 6,966,211 B2 | 11/2005 | Wu | |
| 7,091,722 B2 * | 8/2006 | Homan et al. | 324/339 |
| 7,375,530 B2 | 5/2008 | Chemali et al. | |
| 7,379,818 B2 | 5/2008 | Rabinovich et al. | |
| 7,859,260 B2 | 12/2010 | Reiderman | |
| 2003/0085707 A1 * | 5/2003 | Minerbo et al. | 324/343 |
| 2009/0205867 A1 | 8/2009 | Reckmann et al. | |
| 2009/0302847 A1 * | 12/2009 | Knizhnik | 324/332 |
| 2010/0123461 A1 | 5/2010 | Folberth et al. | |
| 2011/0074428 A1 | 3/2011 | Wang | |
| 2011/0199088 A1 | 8/2011 | Bittar | |
| 2011/0238220 A1 | 9/2011 | Seydoux et al. | |
| 2012/0105076 A1 | 5/2012 | Li et al. | |

* cited by examiner

*Primary Examiner* — John Breene
*Assistant Examiner* — Raymond Nimox
(74) *Attorney, Agent, or Firm* — Mossman Kumar & Tyler PC (57) ABSTRACT

An apparatus and method for estimating a parameter of interest in a borehole penetrating an earth formation using a receiver and a transmitter, both disposed on a carrier, with aligned magnetic moments to correct for bending of carrier during borehole investigations. The apparatus may include a transmitter with at least two substantially perpendicular coils and a receiver with at least one coil oriented with at least one or the transmitter coils. The method may include aligning the magnetic moment of the transmitter and the magnetic moment of the receiver prior to estimating the parameter of interest. The method may include supplying a constant electric current to one of the transmitter coils while supplying a varying electric current to another of the transmitter coils. The method may include estimating a direction of bending or angle of bending of the carrier.

19 Claims, 10 Drawing Sheets

BENDING CORRECTION FOR DEEP READING AZIMUTHAL PROPAGATION RESISTIVITY

FIELD OF THE DISCLOSURE

This disclosure generally relates to exploration for hydrocarbons involving electrical investigations of a borehole penetrating an earth formation.

BACKGROUND OF THE DISCLOSURE

In downhole operations such as drilling, geosteering and measurement-while-drilling (MWD) operations, sensor devices are included with a borehole string that measure various parameters of a formation and/or a borehole. Such sensor devices are typically arranged to have a desired orientation or alignment, and resulting measurements are analyzed based on such alignments. Navigating through earth formation may result in sensor devices shifting from a desired alignment, including bending of the carrier along which the sensor devices may be positioned. It is important to use transmitter or receiver sensors with directionality perpendicular to the borehole axis. If the transmitter and receiver sensors are not exactly parallel or perpendicular to each other (depending on the measurement principle), the measurement might be disturbed significantly. While misalignment of a sensor is based on manufacturing inaccuracies, bending is an effect caused by drilling conditions. Due to steering, the bottom hole assembly (BHA) may curve and the components of the drill string may suffer bending. Deep azimuthal measurements may require generally larger spacing of receiver and transmitter; therefore the bending angle is greater and the measurement disturbance more significant.

SUMMARY OF THE DISCLOSURE

In aspects, the present disclosure is related to methods and apparatuses for aligning magnetic moments of transmitter and receiver for estimating at least one parameter of interest in a borehole penetrating an earth formation.

One embodiment according to the present disclosure includes a method of conducting logging operations in a borehole penetrating an earth formation, comprising: estimating at least one parameter of interest of the earth formation using a signal generated by at least one receiver antenna and responsive to a signal generated by at least one transmitter antenna with a magnetic moment substantially aligned with a magnetic moment of the at least one receiver antenna.

Another embodiment according to the present disclosure includes an apparatus for conducting logging operations in a borehole penetrating an earth formation, comprising: a carrier configured to be conveyed in the borehole; at least one transmitter antenna disposed on the carrier and configured to transmit energy into the earth formation; at least one receiver antenna disposed on the carrier and configured to receive a signal from the earth formation, wherein a magnetic moment of the at least one transmitter antenna is substantially aligned with a magnetic moment of the at least one receiver antenna; and at least one processor configured to: estimate at least one parameter of interest of the earth formation using the signal generated by the at least one receiver antenna.

Another embodiment according to the present disclosure includes a non-transitory computer-readable medium product having stored thereon instructions that, when executed by at least one processor, cause the at least one processor to perform a method, the method comprising: estimating at least one parameter of interest of the earth formation using a signal generated by at least one receiver antenna and responsive to a signal generated by at least one transmitter antenna with a magnetic moment substantially aligned with a magnetic moment of the at least one receiver antenna.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

This disclosure generally relates to exploration for hydrocarbons involving electromagnetic investigations of a borehole penetrating an earth formation. These investigations may include estimating at least one parameter of interest of the earth formation using a transmitter and a receiver with aligned magnetic moments.

Even when bending and/or misalignment are present, a measurement may be performed as if there were no bending and/or misalignment. In this way, the present disclosure teaches negating or reducing the effects of bending and/or misalignment. This reduction may take place instead of or in addition to error reductions in measurement data.

A transmitter antenna may be configured to generate a magnetic moment in x-direction and to induce a magnetic moment in z-direction. The antenna may include at least two coils, where one coil may be used to generate the magnetic moment in the z-direction, and another coil may be used to generate the magnetic moment in the x-direction. Herein, the z-direction refers to the borehole direction, and the x-direction refers to the radial direction.

The coils may be energized in phase with independent amplitudes over a range of amplitudes to cause a tilt in the resulting magnetic moment. This tilt may be used to achieve the desired perpendicular magnetic moments between transmitter and receiver in order to get azimuthal deep boundary information. The magnetic axial component may be swept, and the receiver data are sampled for each borehole angle. By applying currents in phase with different amplitude, it is possible to generate different magnetic moments in x- and z-direction which may be superimposed to produce a resulting magnetic moment.

If the bending angle and direction are known, the correct boundary information could be determined by calculating the correct sinusoidal curve over the borehole azimuth carrying the desired information. If the bending angle and direction are not known, the equipment may be configured to sweep the radial component of the magnetic moment. Bending angle and direction may then be derived from the azimuthal borehole sinusoidal curve with maximum magnitude values. Bending angle and direction may also be estimated using one or more strain gauges disposed on the BHA. In some embodiments, the strain gauge(s) may be located close to the receiver and/or the transmitter. Another alternative for estimating the bending and direction may include sweeping the transmitter magnetic moment by small increments to find an angle where the receiver response is maximized. The receiver response may be maximized when the magnetic moments of the receiver and the transmitter are pointing in the same direction. By sampling the receiver data in small steps of the magnetic x-moment, the maximum magnitude value for each borehole angle may be determined, and, from these, the bending angle and direction estimated.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Figure 1:
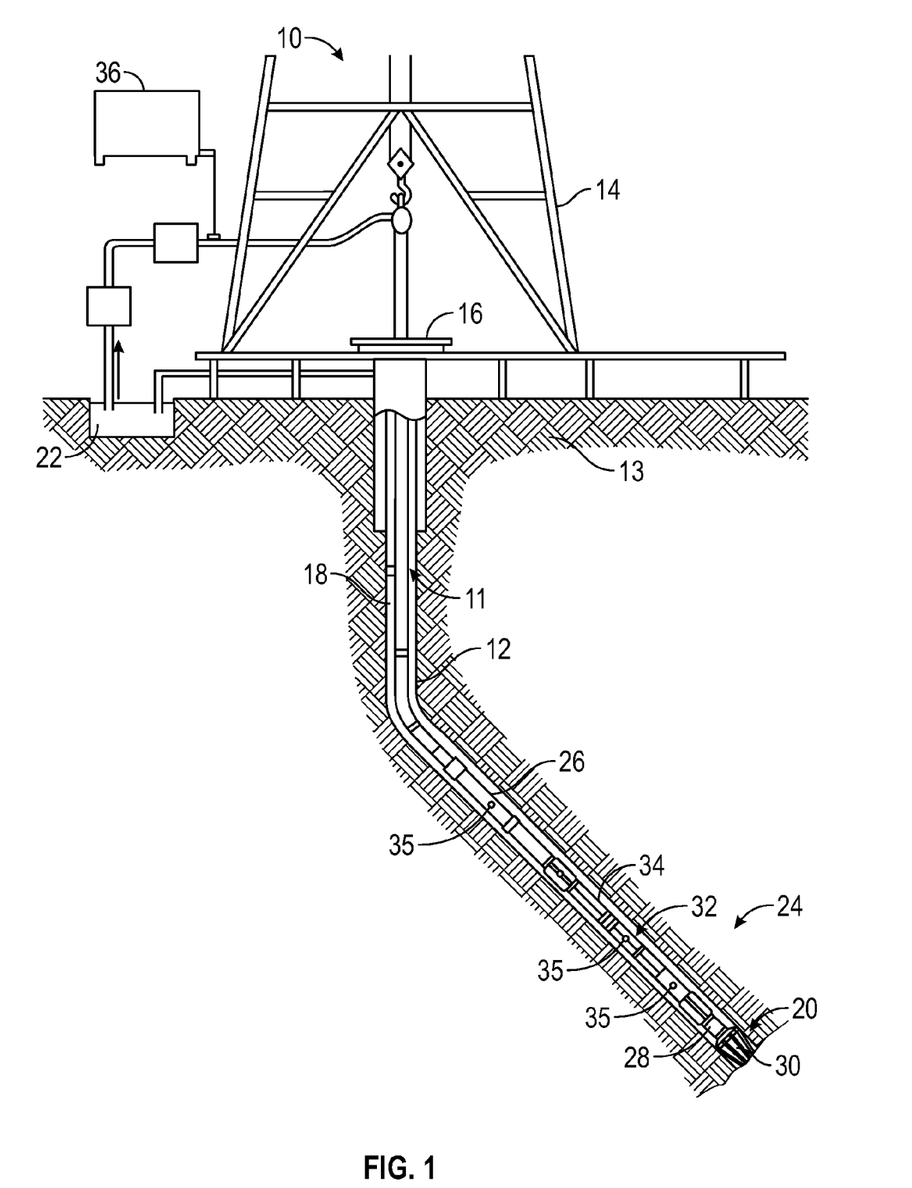
FIG. 1 shows a schematic of a bottom hole assembly (BHA) deployed in a wellbore along a drill string according to one embodiment of the present disclosure.

FIG. 1 shows an exemplary embodiment of a well drilling, logging and/or geosteering system 10 includes a drill string 11 that is shown disposed in a wellbore or borehole 12 that penetrates at least one earth formation 13 during a drilling operation and makes measurements of properties of the formation 13 and/or the borehole 12 downhole. As described herein, "borehole" or "wellbore" refers to a single hole that makes up all or part of a drilled well. As described herein, "earth formations" refer to the various features and materials that may be encountered in a subsurface environment and surround the borehole. The term "information" includes, but is not limited to, raw data, processed data, and signals.

In one embodiment, the system 10 includes a conventional derrick 14 that may supports a rotary table 16 that is rotated at a desired rotational speed. The drill string 11 includes one or more drill pipe sections 18 that extend downward into the borehole 12 from the rotary table 16, and is connected to a drilling assembly 20. Drilling fluid or drilling mud 22 is pumped through the drill string 11 and/or the borehole 12. The well drilling system 10 also includes a bottomhole assembly (BHA) 24. In one embodiment, a drill motor or mud motor 26 is coupled to the drilling assembly 20 and rotates the drilling assembly 20 when the drilling fluid 22 is passed through the mud motor 26 under pressure.

In one embodiment, the drilling assembly 20 includes a steering assembly including a shaft 28 connected to a drill bit 30. The shaft 28, which in one embodiment is coupled to the mud motor, is utilized in geosteering operations to steer the drill bit 30 and the drill string 11 through the formation.

In one embodiment, the drilling assembly 20 is included in the bottomhole assembly (BHA) 24, which is disposable within the system 10 at or near the downhole portion of the drill string 11. The system 10 may include any number of downhole tools 32 for various processes including formation drilling, geosteering, and formation evaluation (FE) for measuring versus depth and/or time one or more physical quantities in or around a borehole. The tool 32 may be included in or embodied as a BHA, drill string component, or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottom-hole assemblies, and drill strings.

In one embodiment, one or more downhole components, such as the drill string 11, the downhole tool 32, the drilling assembly 20 and the drill bit 30, include sensor devices 34 configured to measure various parameters of the formation and/or borehole. For example, one or more parameter sensors 34 (or sensor assemblies such as MWD subs) are configured for formation evaluation measurements and/or other parameters of interest (referred to herein as "evaluation parameters") relating to the formation, borehole, geophysical characteristics, borehole fluids, and boundary conditions. These sensors 34 may include formation evaluation sensors (e.g., resistivity, dielectric constant, water saturation, porosity, density and permeability), sensors for measuring borehole parameters (e.g., borehole size, and borehole roughness), sensors for measuring geophysical parameters (e.g., acoustic velocity and acoustic travel time), sensors for measuring borehole fluid parameters (e.g., viscosity, density, clarity, rheology, pH level, and gas, oil and water contents), boundary condition sensors, and sensors for measuring physical and chemical properties of the borehole fluid.

The system 10 may also include sensors 35 for measuring force, operational and/or environmental parameters related to bending or other deformation of one or more downhole components. The sensors 35 are described collectively herein as "deformation sensors" and encompass any sensors, located at the surface and/or downhole, that provide measurements relating to bending or other deformation of a downhole component. Examples of deformation include deflection, rotation, strain, torsion, and bending. Such sensors 35 provide data that is related to forces on the component (e.g., strain sensors, WOB sensors, TOB sensors) and are used to measure deformation or bending that could result in a change in position, alignment and/or orientation of one or more sensors 34. In one non-limiting embodiment, the sensors 35 may include at least one strain gauge.

For example, a distributed sensor system (DSS) is disposed at the drill string 11 and BHA 24 includes a plurality of sensors 35. The sensors 35 perform measurements associated with forces on the drill string that may result in bending or deformation, and can thereby result in misalignment of one or more sensors 35. Non-limiting example of measurements performed by the sensors 35 include accelerations, velocities, distances, angles, forces, moments, and pressures. Sensors 35 may also be configured to measure environmental parameters such as temperature and pressure. As one example of distribution of sensors, the sensors 35 may be distributed throughout a drill string and tool (such as a drill bit) at the distal end of the drill string 11. In other embodiments, the sensors 35 may be configured to measure directional characteristics at various locations along the borehole 12. Examples of such directional characteristics include inclination and azimuth, curvature, strain, and bending moment.

Figure 2A:
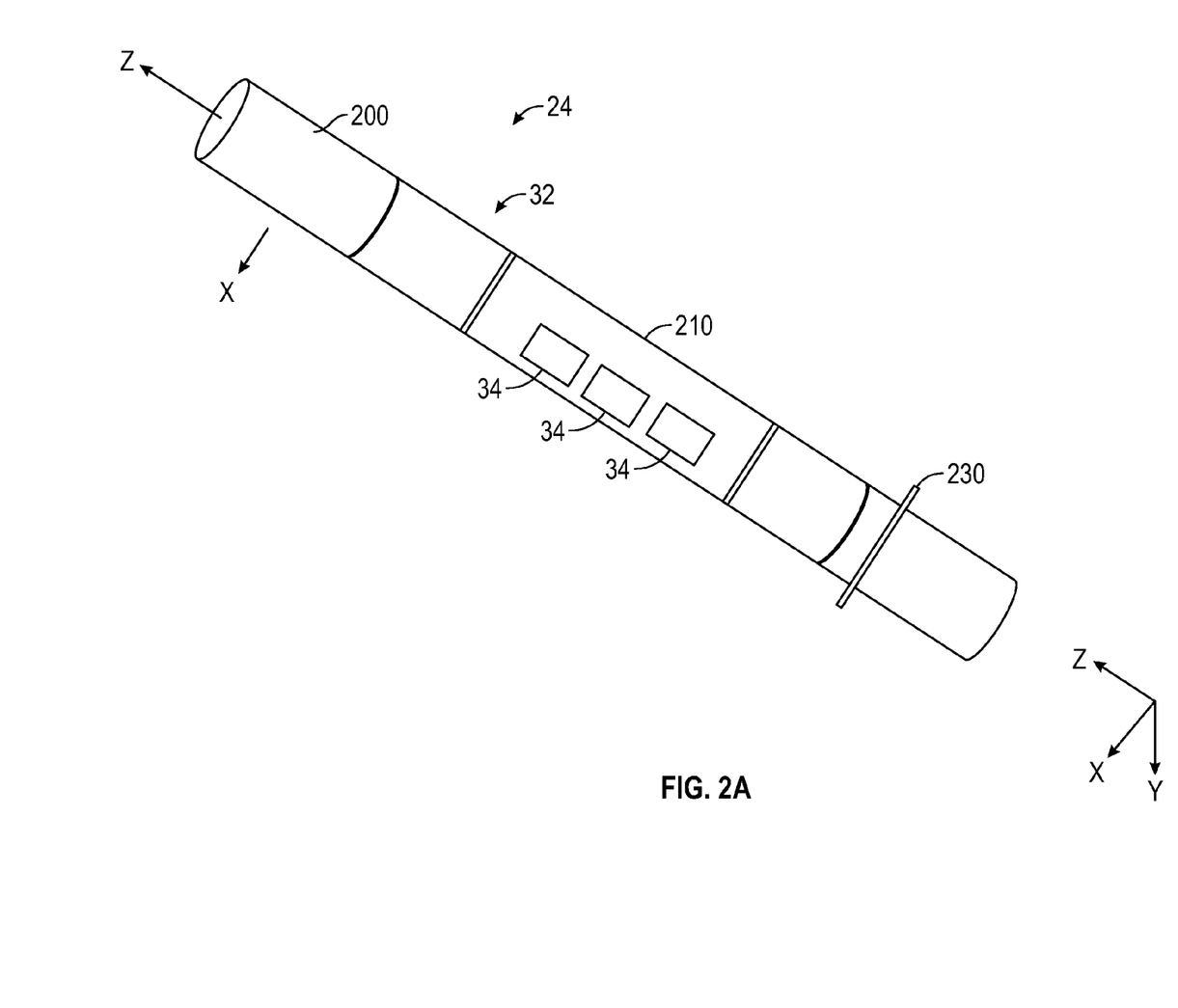
FIG. 2A shows a schematic close up of one embodiment of a BHA configured for pre-measurement bending correction according to one embodiment of the present disclosure.

FIG. 2A shows BHA 24 with one or more sensors 34 incorporated into a drilling sensor sub 210. This drilling sensor sub 210 may include sensors for measuring weight on bit (WOB), torque on bit, annulus and internal pressure, and annulus and instrument temperature. The coordinate system indicates directions for expressing the bending of the sub 210 in the borehole. The sensor sub 210 may include a transmitter 220 and a receiver 230. In some embodiments, the transmitter 220 and/or the receiver 230 may be located on a different sub than the sensors 34. The receiver 230 may include a coil with a resulting magnetic moment in the z-direction.

In one embodiment, the parameter sensors 34 and/or other downhole components include and/or are configured to communicate with at least one processor to receive, measure and/or estimate directional and other characteristics of the downhole components, borehole and/or the formation. For example, the sensors 34 are equipped with transmission equipment to communicate with the at least one processor such as a surface processing unit 36. Such transmission equipment may take any desired form, and different transmission media and connections may be used. Examples of connections include, but are not limited to, wired, fiber optic, acoustic, wireless connections, and mud pulse telemetry.

The at least one processor may be configured to receive data and generate information such as a mathematical model for estimating or predicting bending or other deformation of various components. For example, the at least one processor may be configured to receive downhole data as well as additional data (e.g., from a user or database) such as borehole size and geometric data of borehole components such as component size/shape and material. In one embodiment, the surface processing unit 36 is configured as a surface drilling control unit which controls various drilling parameters such as rotary speed, weight-on-bit, drilling fluid flow parameters, and others and records and displays real-time formation evaluation data. The surface processing unit 36, the tool 32 and/or other components may also include components as necessary to provide for storing and/or processing data collected from various sensors therein. Exemplary components include, without limitation, at least one processor, storage, memory, input devices, output devices and the like.

Generally, some of the teachings herein are reduced to an algorithm that is stored on non-transitory machine-readable media. The algorithm is implemented by a computer or processor such as the surface processing unit 36 or the tool 32 and provides operators with desired output. For example, electronics in the tool 32 may store and process data downhole, or transmit data in real time to the surface processing unit 36 via wireline, or by any kind of telemetry such as mud pulse telemetry or wired pipes during a drilling or measurement-while-drilling (MWD) operation.

Figure 2B:
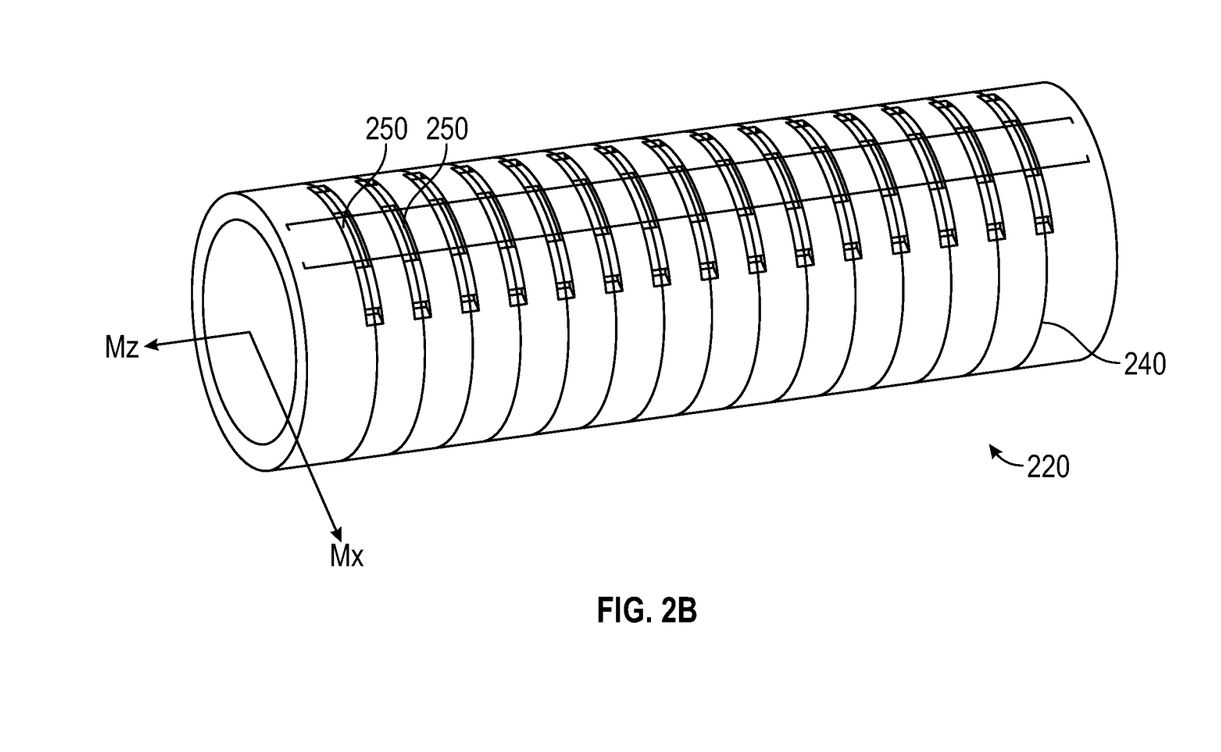
FIG. 2B shows a schematic close up of an XZ-transmitter for a BHA configured for pre-measurement bending correction according to one embodiment of the present disclosure.

FIG. 2B shows transmitter 220 with two coils 240, 250. Coil 240 may be z-oriented to produce a resulting magnetic moment substantially in the z-direction. Coil 250 may be x-oriented to produce a resulting magnetic moment substantially in the x-direction.

Figure 3:
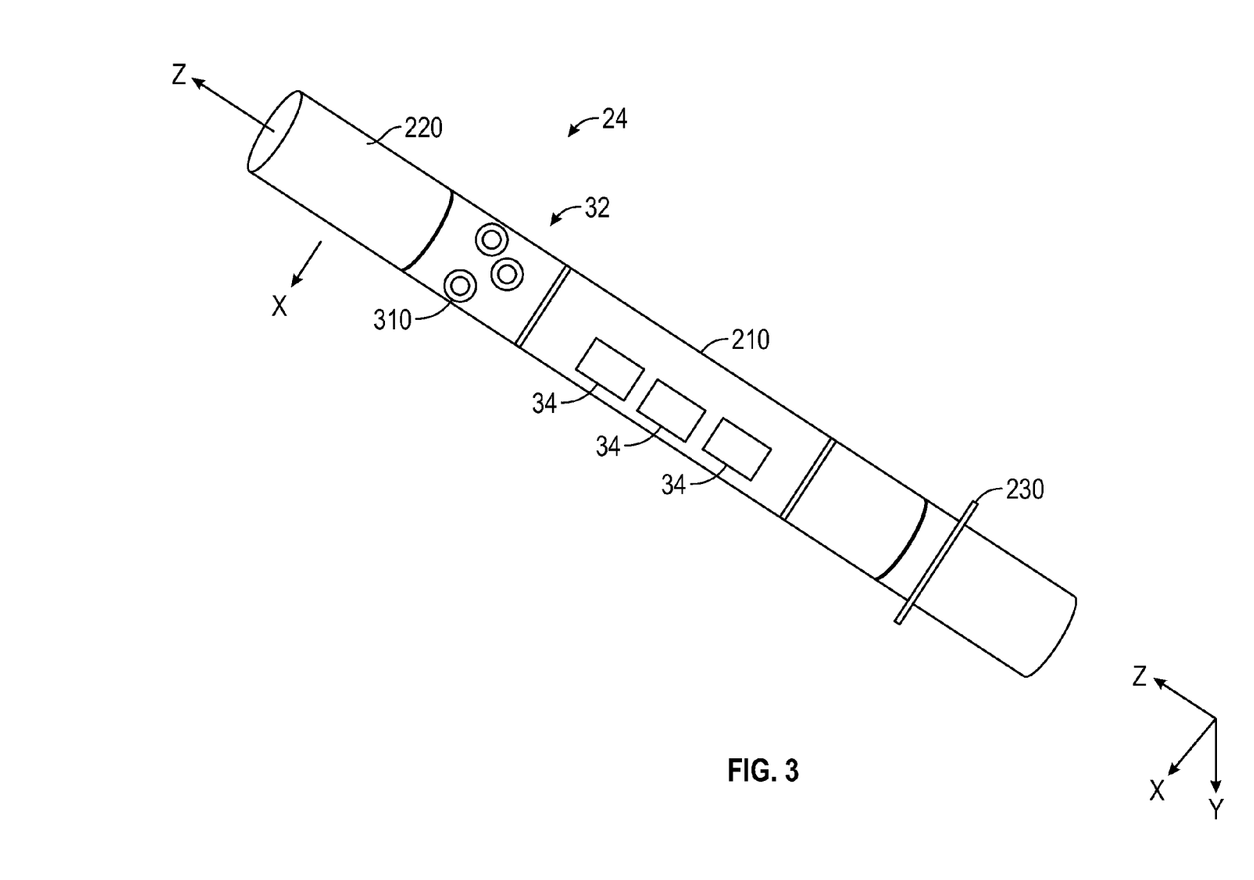
FIG. 3 shows a schematic close up of another embodiment of a BHA configured for pre-measurement bending correction according to one embodiment of the present disclosure.

FIG. 3 shows BHA 24 with a one or more bending sensors 310 configured to estimate a deformation of the sub 210. Information from the one or more bending sensors 310 may be used to estimate bending and direction of bending in sub 210. While the BHA 24 is generally shown oriented with the transmitter 220 above the receiver 230 relative to the BHA 24, this is exemplary and illustrative only, as some embodiments may have the transmitter 220 located below the receiver 230 along the BHA 24. In some embodiments, the receiver 230 may use an x-coil instead of or in addition to the z-coil.

Figure 4:
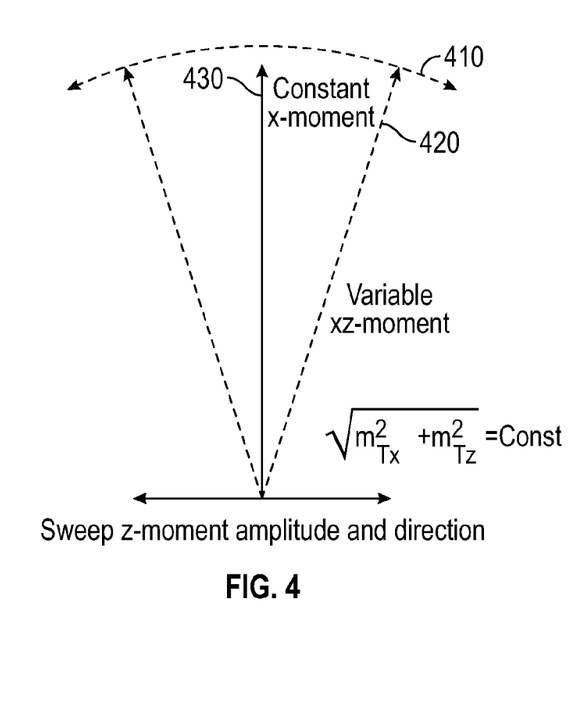
FIG. 4 shows a chart of a magnetic z-moment sweep according to one embodiment of the present disclosure.

FIG. 4 shows a sweep 410 of the XZ-magnetic moment 420 due to adjustment of the z-magnetic moment by varying the current in the z-coil 240 while the current in the x-coil 250 (generating the magnetic x-moment 430) is held constant. When a measurement error is due to simple misalignment and this misalignment is known, the current through the z-coil 240 may be adjusted in achieve the correct angle for setting the magnetic moments of the transmitter 220 and receiver 230 such that they are perpendicular to each other. However, when a measurement error is due to bending of the drill string 11 causing the transmitter 220 and receiver 230 to be out of alignment, restoring the measurement conditions to a pre-bent state may include additional complications. The XZ-magnetic moment 420 may be kept constant during the sweep. In one embodiment, the magnetic moment may be kept constant using a formula as follows:

$$\text{Const}\sqrt{m_{Tx}^2 + m_{Tz}^2}$$

where $m_{Tx}$ is the transmitter magnetic moment in the x-direction and $m_{Tz}$ is the transmitter magnetic moment in the z-direction. In case of very small bending angles (less than 4 degrees) this adaptation may not be optional. In some embodiments, an x-coil receiver may be used to receive a signal from a z-coil transmitter where the amplification and polarity of the z-coil signal may be varied to sweep the magnetic moment. In some embodiments, the magnetic moment of the receiver and the magnetic moment of the transmitter may be aligned to be one of: (i) substantially parallel and (ii) substantially perpendicular.

Figure 5:
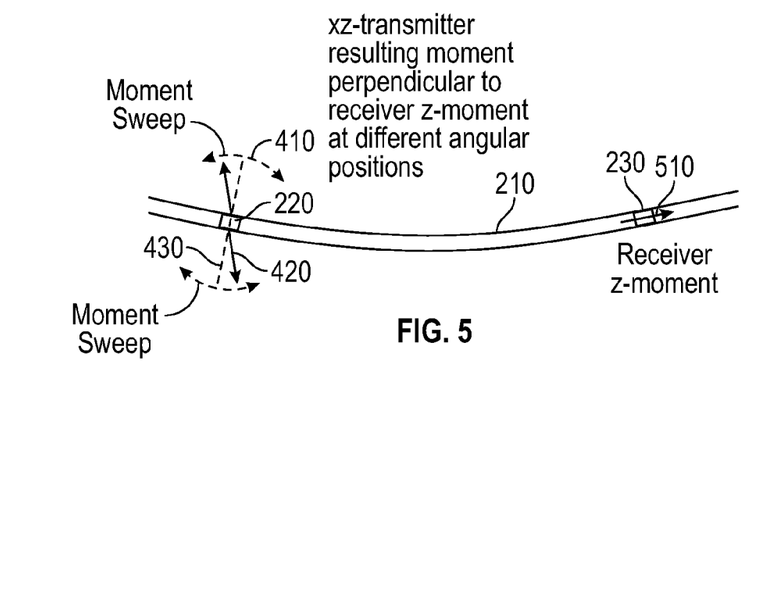
FIG. 5 shows a schematic of a transmitter and receiver with magnetic moment directions according to one embodiment of the present disclosure.

FIG. 5 illustrates estimating bending angle and direction with a swept magnetic moment 410. Along the swept magnetic moment 410, a magnetic moment 420 may reach an angular position that is perpendicular to magnetic moment 510 of z-receiver 230. This correct angular position may vary over the full tool rotation in form of a sinusoid.

Figure 6A:
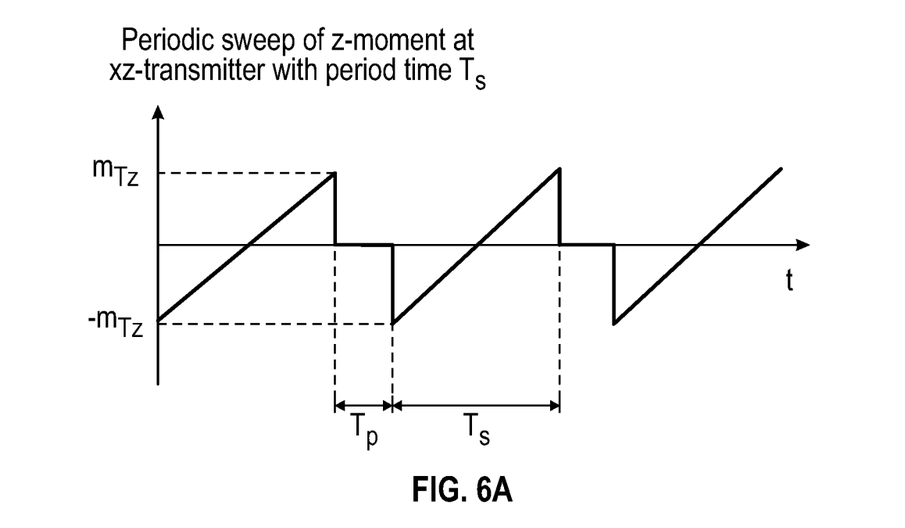
FIG. 6A shows a chart of a period sweep transmitter signal according to one embodiment of the present disclosure.
Figure 6B:
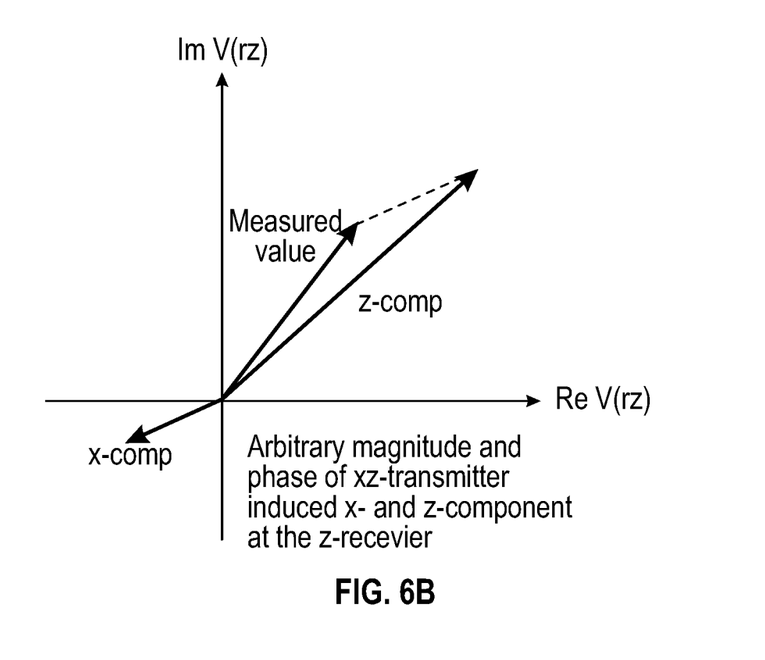
FIG. 6B shows a chart of real and imaginary magnitudes of the received signal due to the transmitter signal of FIG. 6A according to one embodiment of the present disclosure.

FIGS. 6A and 6B illustrate the periodic sweep of the z-moment at transmitter 220. For example, a periodic ramp function in FIG. 6A may be generated at the transmitter 220. The periodic ramp function may be generated over a sweep interval ($T_s$). An optional pause time ($T_p$) may be implemented where neither z- or x-moments are present. At the z-receiver 230, the measured values caused by the transmitter sweep 410 may be sampled and recorded. The sampled values carry information of x- and z-components of the transmitter signal after passing though the formation 13. FIG. 6B, shows a chart of the imaginary and real parts of the transmitter signal z-component corresponding to the periodic ramp function of FIG. 6A. In some embodiments, the sweep may be based on the output of a function generator. In some embodiments, the sweep may be based on outputs from at least one borehole sensor on the BHA 24 (such as a strain gauge).

Figure 7:
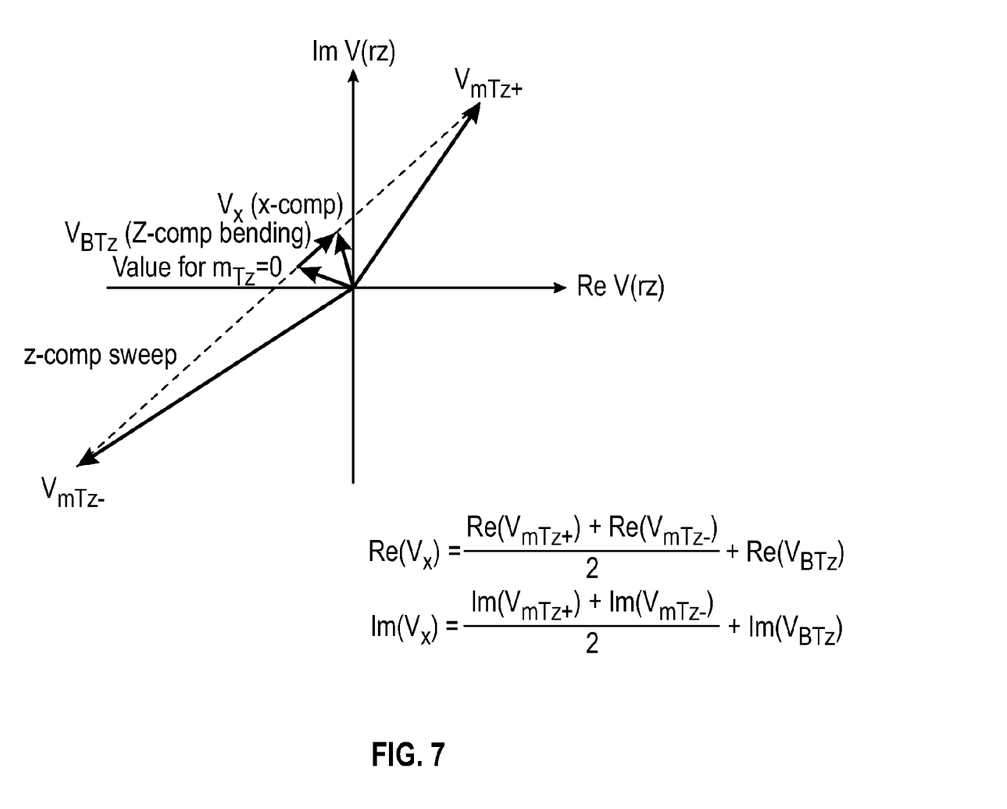
FIG. 7 shows a chart of real and imaginary magnitudes of the received signal during a z-moment sweep according to one embodiment of the present disclosure.

FIG. 7 shows a chart illustrating one non-limiting example of how a boundary signal may be determined. The sampled data may be separated into real and imaginary parts. The range may be bordered by the measured values of the maximum and minimum magnetic z-moments of the sweep. The neutral value, where z-moment is zero, may be estimated by a complex number average calculation. A bending value may be added in order to correct the measurement at the angular position of the neutral value. The result of the combination of the average and the bending value may be the point during the sweep when xz-transmitter 220 and z-receiver 230 magnetic moments are substantially perpendicular to each other.

Figure 8A:
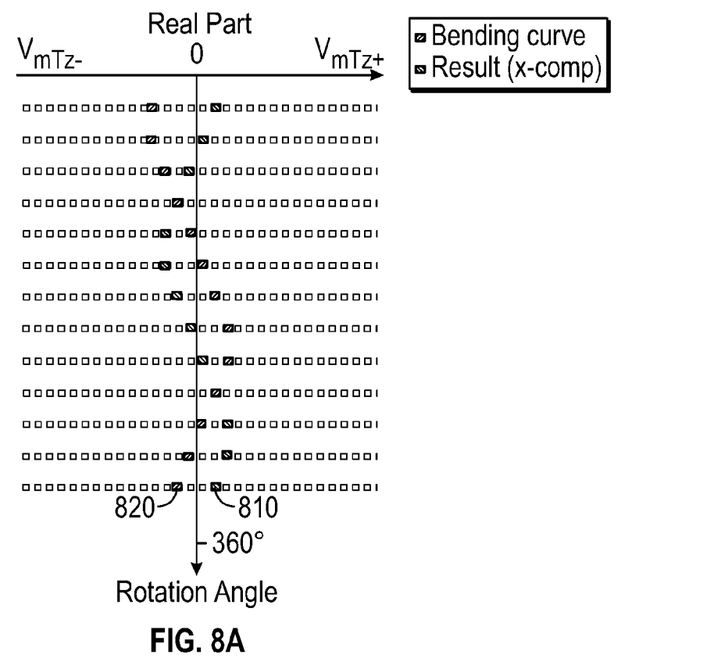
FIG. 8A shows a chart of the real part of a boundary signal estimated for each angular position of a BHA according to one embodiment of the present disclosure.
Figure 8B:
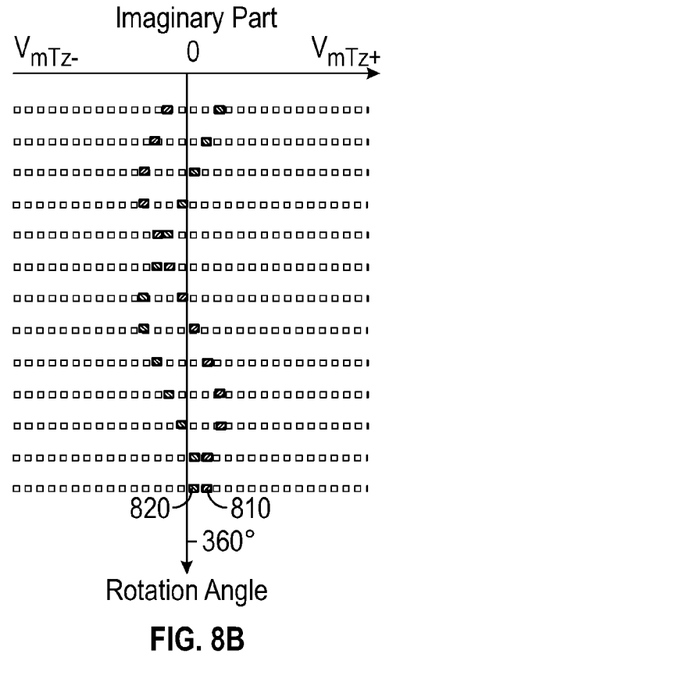
FIG. 8B shows a chart of the imaginary part of a boundary signal estimated for each angular position of a BHA according to one embodiment of the present disclosure.

FIGS. 8A and 8B show real and imaginary parts of a boundary signal 810 estimated for each angular position of the sub 210. The boundary signal 810 may include a bending signal value 820. The bending signal value 820 may be estimated using the angle and direction of the bending data. The resulting boundary signal 810 may be estimated using data sampled over the z-moment sweep 410 and over the angular position of sub 210.

Figure 9:
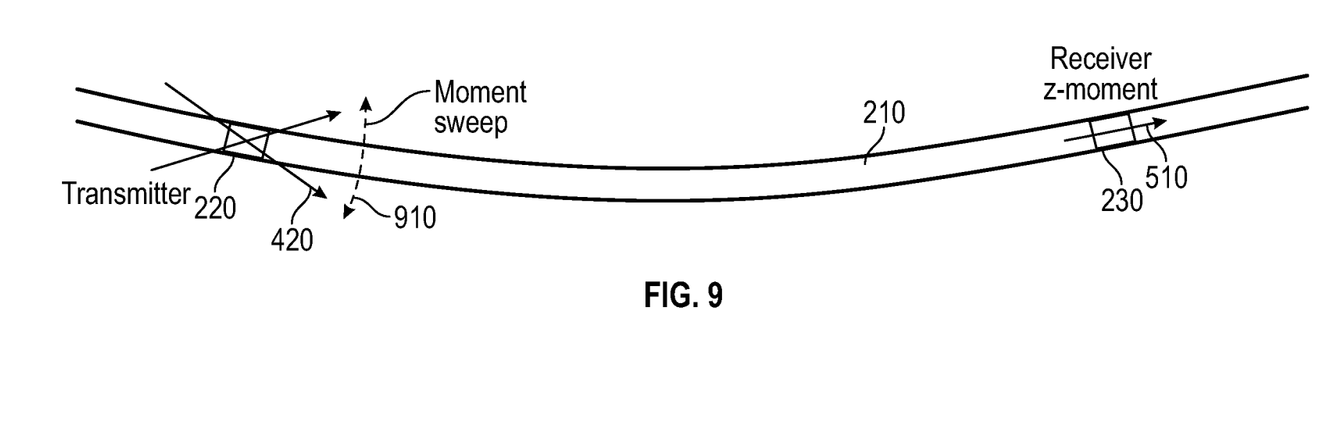
FIG. 9 shows a schematic of a transmitter and receiver with a magnetic moment sweep for determining a bending angle according to one embodiment of the present disclosure.

FIG. 9 shows an embodiment where bending angle and direction may be estimated using a sweep of an x-moment direction 910. Here, the strength of the z-moment and x-moment at the transmitter 220 may be inversed. The bending curve may be estimated by holding the z-moment constant, and varying xz-moment direction 420 by changing the current to the x-coil 250 of the transmitter 220. The magnitude of the x-moment may be selected to reduce the effects of a boundary formation. In some embodiments, the magnetic x-moment may be swept over a small angular range of +/−4 degrees. When the transmitter 220 and receiver 230 are oriented so that their magnetic moments are pointing in identical directions, the signal at the receiver 230 may be maximized.

Figure 10:
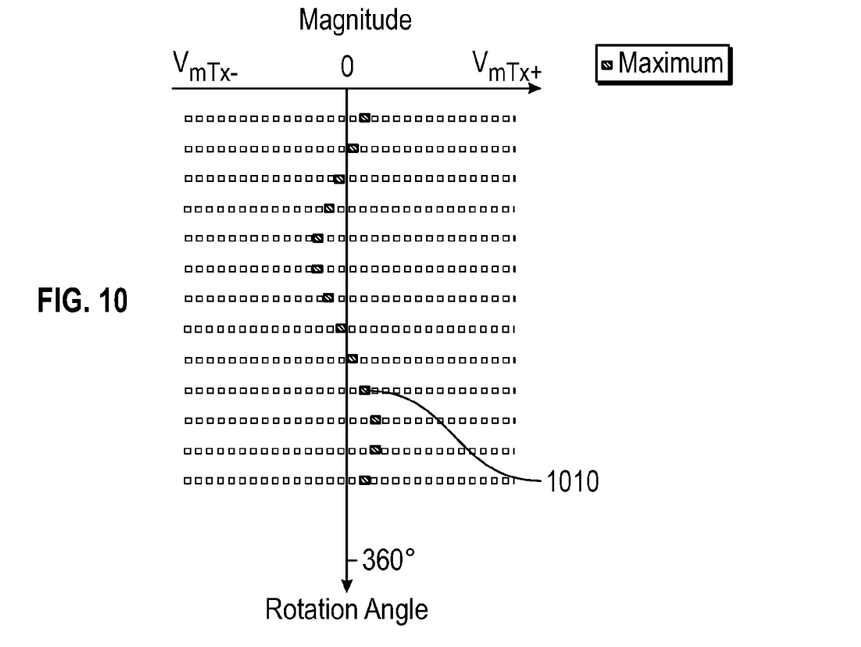
FIG. 10 shows a chart of maximum received values at a receiver along an angular range of a borehole for determining bending and direction according to one embodiment of the present disclosure.

FIG. 10 shows a maximum signal value 1010 at different rotation angles. The resulting sinusoidal curve of maximum magnitudes over the borehole angle may be used to estimate the bending angle and direction.

Figure 11:
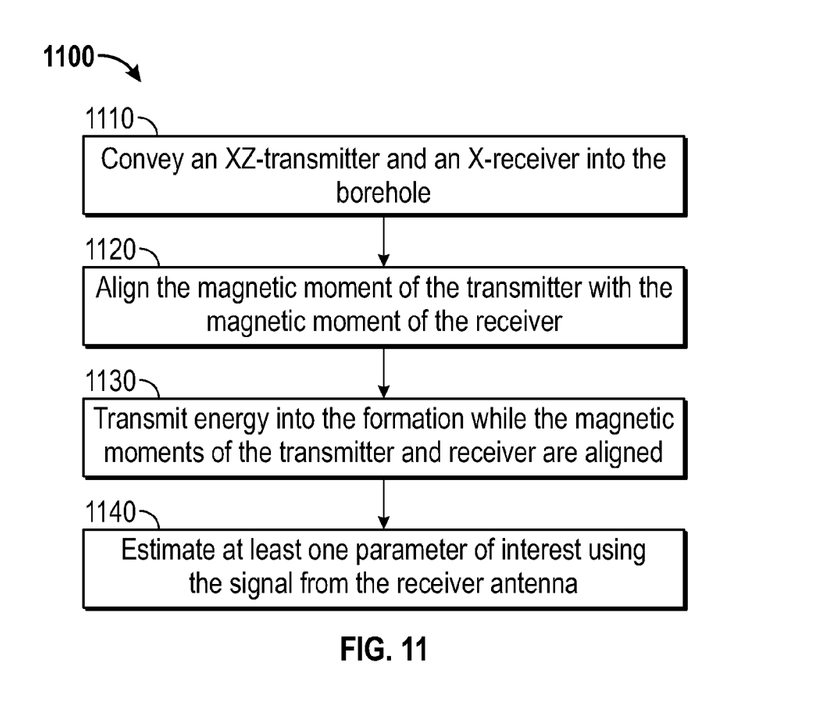
FIG. 11 shows a flow chart of a method for estimating at least one parameter of interest according to one embodiment of the present disclosure.

FIG. 11 shows a flow chart of a method 1100 according to one embodiment for the present disclosure. In step 1110, the BHA 24 may be conveyed in the borehole 12. The BHA 24 may include transmitter 220 and receiver 230. The transmitter 220 may include an x-coil and a z-coil, and the receiver 230 may include a z-coil. In some embodiments, the coils of the transmitter may be substantially perpendicular to one another even if not oriented in the x-direction and the z-direction. In step 1120, the magnetic moment of the transmitter 220 may be aligned with the magnetic moment of the receiver 230. The alignment may be performed while the BHA 24 is stationary, rotating, and/or moving along the borehole 12. The alignment may include sweeping the magnetic z-moment of the transmitter while holding the magnetic x-moment constant and sampling the signal received by the receiver 230. The alignment may include energizing coils 240 and 250 with electric current. The current of x-coil 250 may be held constant while the current of z-coil 240 may be varied to cause a sweep in the magnetic moment of transmitter 220. The current in the coils 240, 250 may be in phase. In some embodiments, the current in the coils 240, 250 may be phase shifted up to about 5 degrees. In some embodiments, the alignment may include modifying the transmitter xz-moment using bending angle and/or direction information. The bending angle and/or direction information may be estimated using a bending sensor (strain gauge, etc.) or by sweeping the magnetic x-moment of the transmitter while holding the z-moment constant.

In step 1130, energy may be transmitted into the earth formation 13 using the transmitter 220 that is now aligned with the receiver 230. In step 1140, at least one parameter of interest may be estimated using a signal generated by the receiver 230 in response to a signal from the earth formation 13. The at least one parameter of interest may include, but is not limited to, one or more of: (i) a resistivity property of the earth formation, (ii) a direction of the bending in relation to borehole azimuth, and (iii) a bending angle.

Implicit in the processing of the data is the use of a computer program implemented on a suitable non-transitory machine-readable medium that enables the processor to perform the control and processing. The term processor as used in this application is intended to include such devices as field programmable gate arrays (FPGAs). The non-transitory machine-readable medium may include ROMs, EPROMs, EAROMs, Flash Memories and Optical disks. As noted above, the processing may be done downhole or at the surface, by using one or more processors. In addition, results of the processing, such as an image of a resistivity property, can be stored on a suitable medium.

While the foregoing disclosure is directed to the one mode embodiments of the disclosure, various modifications will be apparent to those skilled in the art. It is intended that all variations be embraced by the foregoing disclosure.

What is claimed is:

1. A method of conducting logging operations in a borehole penetrating an earth formation, comprising:
   aligning a magnetic moment of at least one transmitter antenna with a magnetic moment of at least one receiver antenna by applying a first current and a second current to the at least one transmitter antenna; and
   estimating at least one parameter of interest of the earth formation using a signal generated by the at least one receiver antenna and responsive to a signal generated by the at least one transmitter antenna with the magnetic moment substantially aligned with the magnetic moment of the at least one receiver antenna.

2. The method of claim 1, wherein the alignment between the magnetic moments of the at least one receiver antenna and the at least one transmitter antenna is one of: (i) substantially parallel and (ii) substantially perpendicular.

3. The method of claim 1, wherein the at least one transmitter antenna includes a first coil and a second coil, the second coil being substantially perpendicular to the first coil.

4. The method of claim 3, wherein the first coil is substantially oriented in a z-direction and the second coil is substantially oriented in an x-direction.

5. The method of claim 3, wherein the at least one transmitter antenna is aligned with the at least one receiver antenna by applying the first current to the first coil and the second current to the second coil.

6. The method of claim 5, wherein the first current and the second current are in phase.

7. The method of claim 1, further comprising:
   conveying the at least one receiver antenna and the at least one transmitter antenna in the borehole on a carrier.

8. The method of claim 1, wherein the at least one parameter of interest includes one of: (i) a resistivity property of the earth formation, (ii) a direction of the bending in relation to borehole azimuth, and (iii) a bending angle.

9. The method of claim 1, wherein the at least one parameter of interest is estimated azimuthally in the borehole.

10. An apparatus for conducting logging operations in a borehole penetrating an earth formation, comprising:
a carrier configured to be conveyed in the borehole;
at least one transmitter antenna disposed on the carrier and configured to transmit energy into the earth formation;
at least one receiver antenna disposed on the carrier and configured to receive a signal from the earth formation,
wherein a magnetic moment of the at least one transmitter antenna is substantially aligned with a magnetic moment of the at least one receiver antenna by applying a first current and a second current to the at least one transmitter antenna; and
at least one processor configured to:
estimate at least one parameter of interest of the earth formation using the signal generated by the at least one receiver antenna.

11. The apparatus of claim 10, wherein the signal generated by the at least one receiver antenna is indicative of a resistivity property of the earth formation.

12. The apparatus of claim 10, wherein the alignment between the magnetic moments of the at least one receiver antenna and the at least one transmitter antenna is one of: (i) substantially parallel and (ii) substantially perpendicular.

13. The apparatus of claim 10, wherein the at least one transmitter antenna includes a first coil and a second coil, the second coil being substantially perpendicular to the first coil.

14. The apparatus of claim 13, further comprising:
at least one power supply configured to supply the first current to the first coil and the second current to the second coil.

15. The apparatus of claim 14, wherein the first current and the second current are in phase.

16. The apparatus of claim 10, wherein the at least one parameter of interest includes one of: (i) a resistivity property of the earth formation, (ii) a direction of the bending in relation to borehole azimuth, and (iii) a bending angle.

17. The apparatus of claim 10, wherein the at least one processor is configured to estimate the at least one parameter of interest azimuthally in the borehole.

18. A non-transitory computer-readable medium product having stored thereon instructions that, when executed by at least one processor, cause the at least one processor to perform a method, the method comprising:
aligning a magnetic moment of at least one transmitter antenna with a magnetic moment of at least one receiver antenna by applying a first current and a second current to the at least one transmitter antenna; and
estimating at least one parameter of interest of the earth formation using a signal generated by the at least one receiver antenna and responsive to a signal generated by the at least one transmitter antenna with the magnetic moment substantially aligned with the magnetic moment of the receiver antenna.

19. The non-transitory computer-readable medium product of claim 18 further comprising at least one of: (i) a ROM, (ii) an EPROM, (iii) an EEPROM, (iv) a flash memory, and (v) an optical disk.

* * * * *